(12) United States Patent
Marrison et al.

(10) Patent No.: US 7,225,833 B2
(45) Date of Patent: Jun. 5, 2007

(54) FLUID CONNECTOR WITH ADJUSTABLE FLOW CONTROL

(75) Inventors: William C Marrison, Jackson, MI (US); Alexander P Webster, Concord, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/886,889

(22) Filed: Jul. 8, 2004

(65) Prior Publication Data

US 2005/0005975 A1   Jan. 13, 2005

Related U.S. Application Data (60) Provisional application No. 60/485,455, filed on Jul. 8, 2003.

(51) Int. Cl.
F16L 37/36 (2006.01)
(52) U.S. Cl. .......................... 137/614.06; 137/614.03; 251/318
(58) Field of Classification Search ............... 251/318, 251/284, 285, 149, 149.1, 149.4, 149.5; 137/614.06, 137/614.03, 614.05, 614.04
See application file for complete search history.

(56) References Cited

U.S. PATENT DOCUMENTS

| 1,549,304 | A | * | 8/1925 | Hachenberg | ............. 251/149.5 |
| 4,796,856 | A | * | 1/1989 | Munini | ..................... 251/149.5 |
| 4,840,313 | A | * | 6/1989 | Hansen | ........................ 239/456 |
| 5,058,859 | A | * | 10/1991 | Chen | ........................ 251/149.4 |
| 6,517,119 | B2 | * | 2/2003 | Thomas | ..................... 285/276 |

* cited by examiner

*Primary Examiner*—Kevin Lee
(74) *Attorney, Agent, or Firm*—Benesch, Friedlander, Coplan & Aronoff LLP (57) ABSTRACT

A fluid connector with adjustable flow control includes an adapter having a first threaded portion, a sealing surface and an orifice. The fluid connector also includes a valve body having a second threaded portion for engagement with the first threaded portion and a central body passage connected to at least one port. Upon rotation of the valve body relative to the adapter, the port is displaced axially relative to the sealing surface thereby effecting a change in fluid flow through the fluid connector and into or out of the orifice.

24 Claims, 6 Drawing Sheets

FLUID CONNECTOR WITH ADJUSTABLE FLOW CONTROL

RELATED APPLICATIONS

The present invention claims priority of U.S. Provisional Patent Application, Ser. No. 60/485,455, which was filed on Jul. 8, 2003 and is incorporated herein by reference in its entirety.

BACKGROUND OF THE INVENTION

1. Field of the Invention

The present invention relates to fluid connectors and more specifically to fluid connectors having adjustable fluid flow control capability.

2. Description of the Related Art

Hose assemblies are used in various fluid conveying systems and apparatus that require the flow of fluid for operation. Hose assemblies generally include a length of flexible hose and a pair of end fittings that are sealingly secured to the ends of the hose. Such assemblies come in a variety of sizes, such as −16, −20 or the like, which correspond to the dimension of the hose bore. Generally, the larger the hose bore, the greater the volume of fluid a given hose assembly may convey. A mating port in a fluid conveying system or apparatus is typically provided with a fluid connector, such as an adapter, which secures the end fitting to the fluid conveying system or apparatus.

It will be appreciated that certain economic efficiencies may be realized by using a single hose assembly size, regardless of the flow requirements of the mating fluid conveying system or apparatus. For example, manufacturers of fluid conveying systems often purchase a single hose assembly size in bulk to reduce the per-piece price of each hose assembly. While economically efficient, this strategy may be operationally inefficient, since different fluid conveying systems and apparatus may have different fluid flow rate requirements, which may or may not be readily obtainable using a "one size fits all" approach.

The present invention overcomes limitations of the prior art by providing a fluid connector with adjustable flow control capability, which may be used to, among other things, connect a hose assembly to a fluid conveying system or apparatus.

SUMMARY OF THE INVENTION

A fluid connector with adjustable flow control is provided that includes an adapter having a first threaded portion, a sealing surface and an orifice. The fluid connector also includes a valve body having a second threaded portion for engagement with the first threaded portion and a central body passage connected to at least one port. Upon rotation of the valve body relative to the adapter, the port is displaced axially relative to the sealing surface thereby effecting a change in fluid flow through the fluid connector.

BRIEF DESCRIPTION OF THE DRAWINGS

Embodiments of the invention will now be described, by way of example, with reference to the accompanying drawings, wherein.

DETAILED DESCRIPTION OF THE INVENTION

Certain terminology will be used in the following description for convenience in reference only and will not be limiting. The terms "rightward" and "leftward" refer to directions in the drawings in connection with which the terminology is used. The terms "inwardly" and "outwardly" refer to directions toward and away from, respectively, the geometric center of the apparatus. The terms "upward" and "downward" refer to directions as taken in the drawings in connection with which the terminology is used. All foregoing terms mentioned above include the normal derivatives and equivalents thereof.

Figure 1:
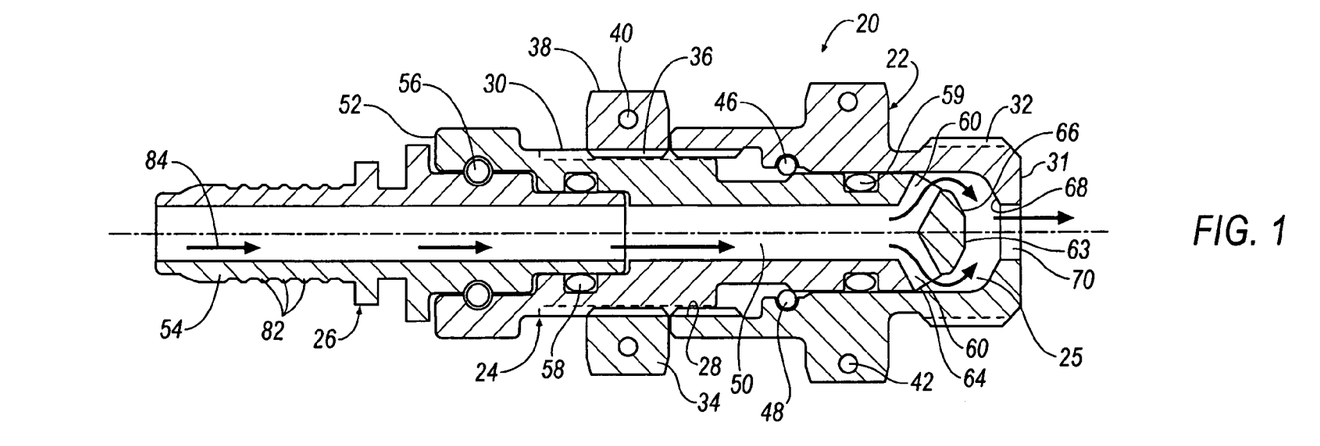
FIG. 1 is a cross-sectional view of a fluid connector according to an embodiment of the present invention, shown in an open state.
Figure 2:
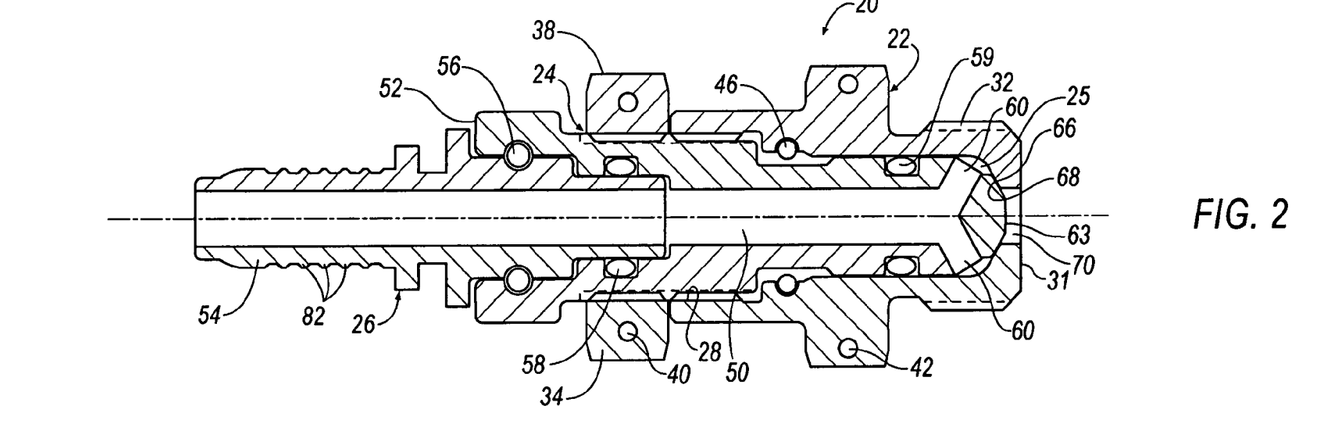
FIG. 2 is a cross-sectional view of the fluid connector of FIG. 1, shown in a closed state.

Referring to FIGS. 1 and 2, cross-sectional views of a fluid connector 20 according to an embodiment of the present invention are shown. For reference, FIG. 1 shows connector 20 in an "open" state, while FIG. 2 shows connector 20 in a "closed" state.

In the illustrated embodiment, connector 20 includes an adapter 22 configured to be mounted into a housing of a fluid conveying device (not shown), such as a pump, motor or valve, for example, and a valve body 24 movably mounted within a bore 25 of adapter 22. A hose assembly 26 (FIG. 3) is joined to the fluid conveying device using fluid connector 20 in a manner that allows the fluid flow rate through connector 20 to be selected by rotating valve body 24 relative to adapter 22.

In a particular configuration, adapter 22 includes an internal threaded portion 28 that cooperates with a mating external threaded portion 30 in valve body 24 to facilitate axial positioning of valve body 24 relative to adapter 22 by rotating valve body 24. A leading end 31 of adapter 22 is configured for connection or attachment to the housing of the fluid conveying device. For example, adapter 22 may include external threads 32 that mate with corresponding internal threads (not shown) in the housing of the fluid conveying device.

Adapter 22 may also include a rotatably adjustable collar 34 having internal threads 36 that mate with external threads 30 in valve body 24. In the illustrated embodiment, collar 34 functions as a lock-nut having a polygonal surface 38 configured for engagement by a wrench or other tool used to rotate collar 34. Collar 34 may be rotated against adapter 22 and torqued to lock valve body 24 in the desired axial position. Alternatively, untorquing and rotating collar 34 away from adapter 22 allows valve body 24 to be rotated relative to adapter 22 to adjust the axial position of valve body 24. Once the desired position of valve body 24 is achieved, collar 34 may be rotated against adapter 22 and re-torqued to lock valve body 24 in the desired position.

To prevent unintended rotation of collar 34, holes 40 and 42 may be formed in collar 34 and adapter 22, respectively, to accommodate the attachment of a safety mechanism, such as a safety wire 44 (see e.g., FIG. 3), latch, or other means for inhibiting movement between the components. Adapter 22 may also include an annular stop member 46, such as a split locking ring or the like, which is received in an inwardly facing groove 48 and positioned to prevent valve body 24 from being removed from adapter 22. A portion of stop member 46 protrudes into bore 25 and abuts valve body 24 when valve body 24 is moved to the fully open position shown in FIG. 1.

In the embodiment shown in FIGS. 1 and 2, valve body 24 includes a central passage 50 that may be stepped adjacent its trailing end 52 to accommodate a generally tubular fitting portion 54 of hose assembly 26. Fitting portion 54 may be retained within central passage 50 by a retaining member 56, such as a split locking ring or the like, which allows for relative rotation between fitting portion 54 and valve body 24. A first annular sealing member 58, such as an O-ring, may also be positioned between fitting portion 52 and valve body 24 to inhibit fluid leakage therebetween. Similarly, a second annular sealing element 59 may be positioned between valve body 24 and adapter 22 to inhibit fluid leakage between these components.

Valve body 24 also includes at least one fluid port 60, which is shown in FIGS. 1 and 2 as being formed proximate a leading end 63 of adapter 22 and joined to central passage 50. In an embodiment, leading end 63 of valve body 24 may be slightly tapered to form a generally conical surface 64. It is within conical surface 64 that fluid port 60 exits valve body 24 and provides central passage 50 in communication with bore 25 of adapter 22. Leading end 63 may also include a sealing surface 66 configured to mate with an inner surface 68 of adapter 22 when valve body 24 is moved axially into contact with adapter 22. Adapter 22 includes an orifice 70 joined to bore 25 of adapter 22, which provides an entrance or exit for fluid traveling through fluid connector 20.

Figure 3:
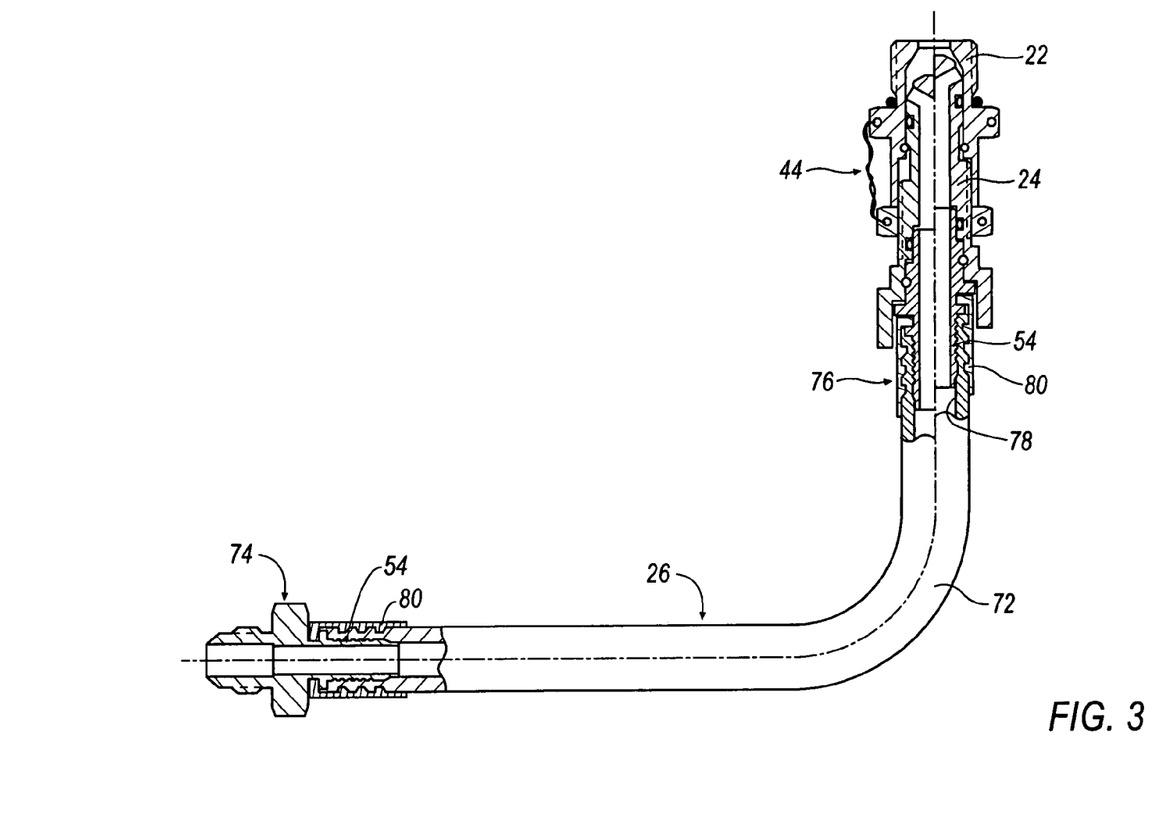
FIG. 3 is a cross-sectional view of the fluid connector of FIG. 1 secured to a hose assembly.

Referring to FIG. 3, a cross-sectional view of fluid connector 20 is shown attached to hose assembly 26. Hose assembly 26 includes a length of hose 72, a first fitting 74 and a second fitting 76 to which fluid connector 20 is attached. In an embodiment, second fitting 76 includes fitting portion 54, which is partially received within a bore 78 of hose 72. Second fitting 76 also includes a socket 80 that is positioned over hose 72 radially outward of fitting portion 54 and crimped around hose 72 to create a clamping force to secure fitting portion 54 to hose 72. Fitting portion 54 may also include barbs 82 (see e.g., FIGS. 1 and 2) to help retain fitting portion 54 within hose 72 when hose assembly 26 is pressurized. First fitting 74 may be configured similar to second fitting 76; however, fitting configurations different than the configuration shown in FIG. 3 may also be used.

Operation of fluid connector 20 will now be described with reference to FIGS. 1–3. When fluid connector 20 is in a fully open state, as shown in FIG. 1, fluid is free to flow (as depicted by arrows 84 shown in FIG. 1) from hose assembly 26 through fitting portion 54, into central passage 50 of valve body 24, through flow ports 60 into adapter bore 25, and then through orifice 70 and into the fluid conveying device to which fluid connector 20 is attached. In contrast, when fluid connector 20 is in a fully closed state, as shown in FIG. 2, the fluid flow path between flow ports 60 in valve body 24 and orifice 70 in adapter 22 is closed off due to contact of sealing surface 66 on valve body 24 with inner surface 68 of adapter 22. To adjust the amount of fluid flow (or fluid flow rate) through fluid connector 20, the axial position of valve body 24 may be modified between the fully open position shown in FIG. 1 and the fully closed position shown in FIG. 2, as described above and shown in FIG. 3.

As will be appreciated, fluid connector 20 may be used to vary the flow of fluid through a mating hose assembly by rotating valve body 24 relative to adapter 22. Rotation of valve body 24 relative to adapter 22 results in a relative change in the flow restriction between flow ports 60 and orifice 70 and a corresponding change in the fluid flow rate through the mating hose assembly.

Figure 4:
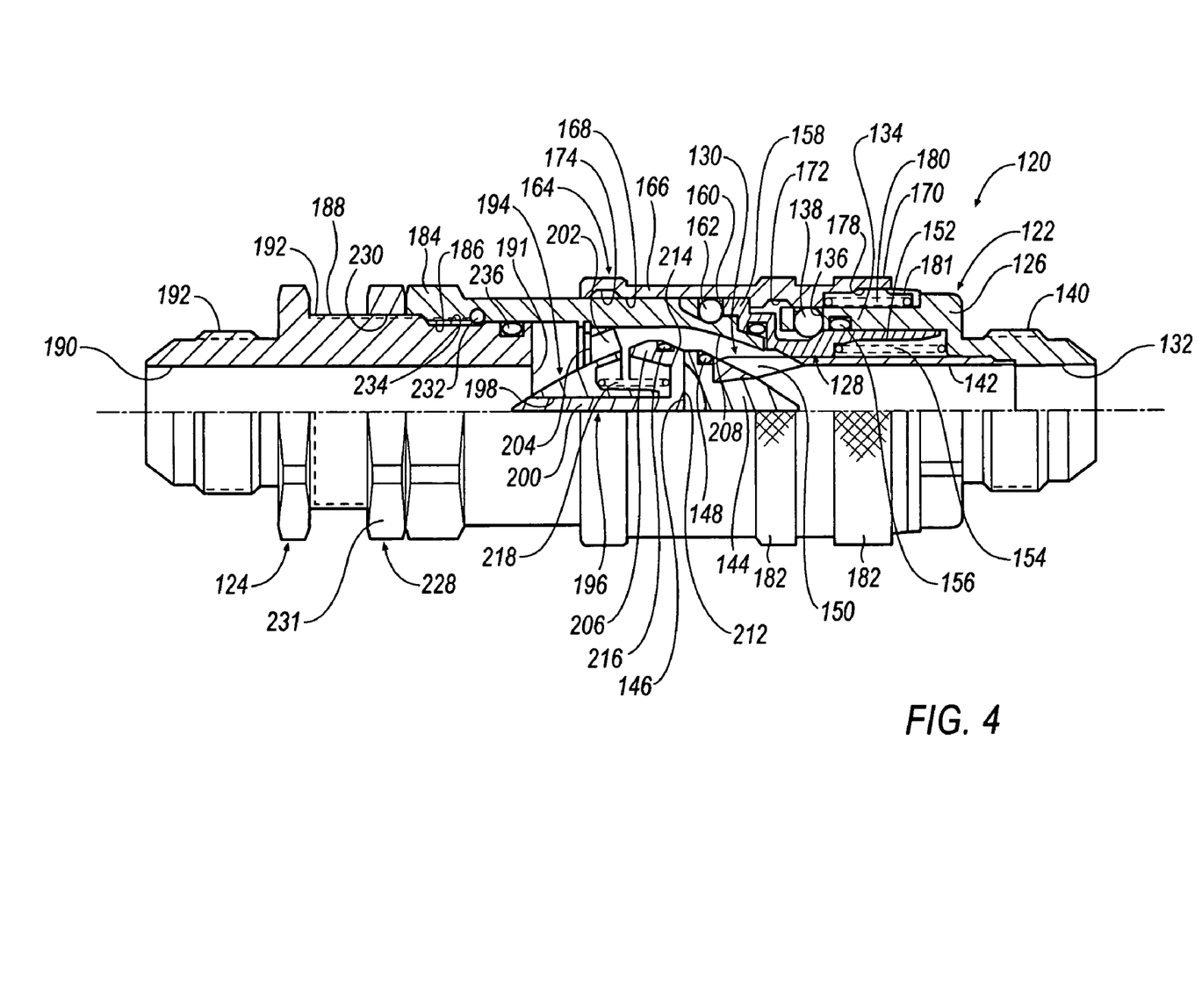
FIG. 4 is a partial cross-sectional view of a fluid connector according to another embodiment of the present invention, shown in an open state.
Figure 5:
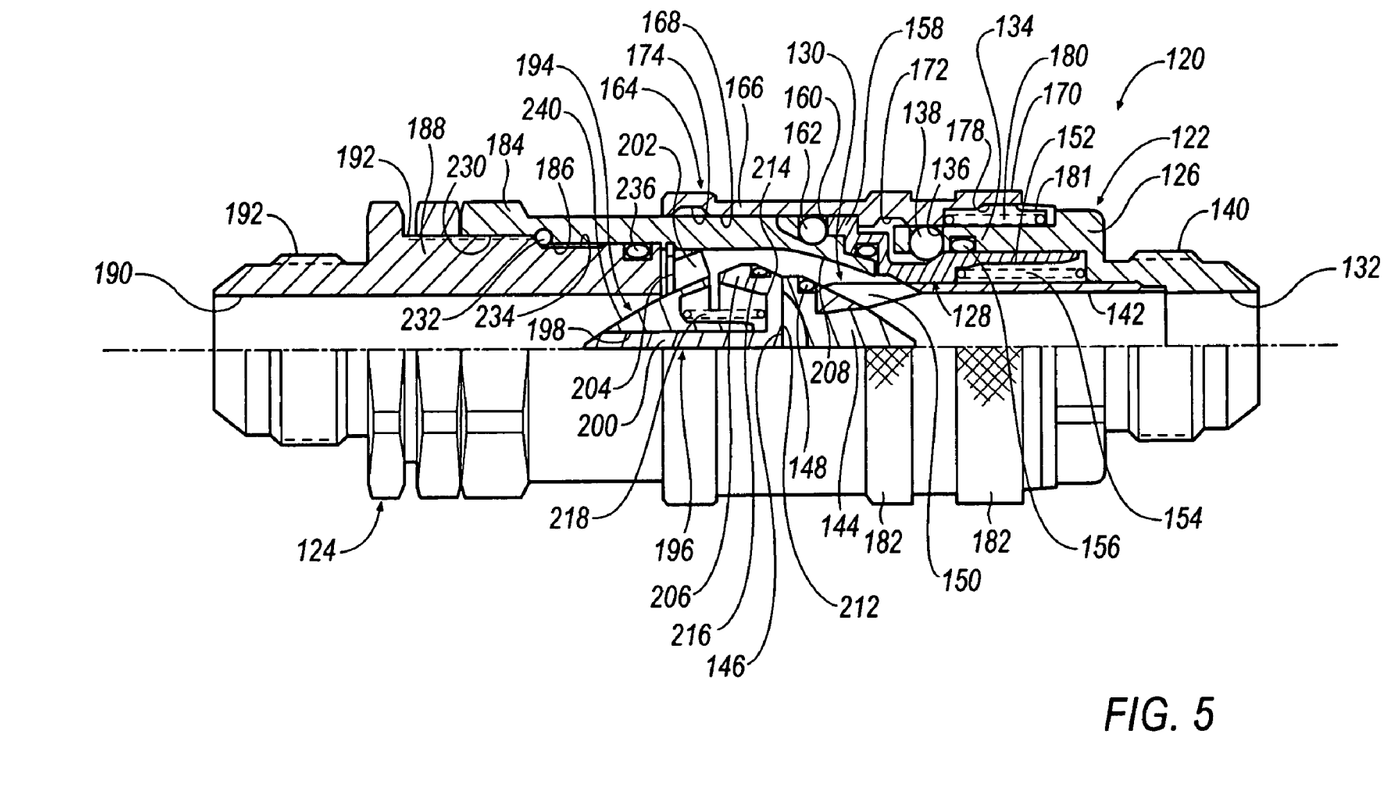
FIG. 5 is a partial cross-sectional view of the fluid connector of FIG. 4, shown in a closed state.

Referring to FIGS. 4–7, a fluid connector 120 according to another embodiment of the present invention is shown. Fluid connector 120 includes a first coupling member 122 and a second coupling member 124 that is connectable to the first coupling member 122. For reference, FIG. 4 shows second coupling member 124 in an "open" state, while FIG. 5 shows second coupling member 124 in a "closed" state.

In an embodiment, first coupling member 122 includes an adapter 126, an axially movable locking sleeve 128 and a fixed valve member 130. Adapter 126 has an axial passageway 132 into which locking sleeve 128 and valve member 130 are received. Passageway 132 is at least partially defined by a generally cylindrical wall 134 that includes a plurality of spaced-apart openings 136 that extend through wall 134. Each opening 136 is sized to receive a radially movable bearing member 138, such as a ball bearing. Like adapter 22 described above, adapter 126 is configured for attachment to the housing of a fluid conveying device. For example, adapter 126 may include external threads 140 that mate with corresponding internal threads (not shown) in the housing of the fluid conveying device.

In an embodiment, fixed valve member 130 includes a generally cylindrical valve stem 142 and a head portion 144. Head portion 144 may be secured to valve stem 142 using a press-fit type connection; however, other methods may be used to make this connection including, without limitation, welding or gluing the components together. Alternatively, head portion 144 and valve stem 142 may be formed as a single component.

In the illustrated embodiment, head portion 144 tapers inwardly and away from a leading edge 146 and may include a sealing member 148, such as an O-ring, for sealingly engaging locking sleeve 128 when first and second coupling members 122, 124 are disconnected. Additionally, valve stem 142 may be provided with at least one fluid flow passage 150 to facilitate the flow of fluid between the exterior and interior of fixed valve member 130 when locking sleeve 128 is moved to the position shown in FIGS. 4 and 5. Valve stem 142 may be secured to adapter 126 within axial passageway 132 using a threaded connection or other type of connecting interface, such as a press-fit type connection.

A first generally cylindrical wall portion 152 of locking sleeve 128 is positioned between cylindrical wall 134 and valve stem 142. Locking sleeve 128 is axially movable between a closed position (see e.g., FIG. 6), in which first wall portion 152 is sealingly engaged with fixed valve member 130, and an open position (see e.g., FIGS. 4 and 5), in which first wall portion 152 is disengaged from fixed valve member 130. In the illustrated configuration, locking sleeve 128 is biased toward the closed position by a resiliently compressible member 154, such as a compression spring or the like. An annular sealing member 156, such as an O-ring, may be provided between adapter 126 and locking sleeve 128 to inhibit fluid leakage therebetween.

In the illustrated embodiment, locking sleeve 128 also includes a second generally cylindrical wall portion 158 that is radially offset relative to first wall portion 152. Second wall portion 158 includes a plurality of spaced-apart openings 160 that extend therethrough. Each opening 160 is sized to receive a radially movable bearing member 162, such as a ball bearing. As will be described in detail below, bearing members 138 and 162 cooperate to secure second coupling member 124 to first coupling member 122 and facilitate relative rotation therebetween.

Referring still to FIGS. 4–7, first coupling member 122 may also include an axially movable release sleeve 164 configured to inhibit axial movement of bearing members 138, 162 while first and second coupling members 122, 124 are connected and to selectively permit axial movement of bearing members 138, 162 when disconnection of first and second coupling members 122, 124 is desired. In an embodiment, release sleeve 164 includes a generally cylindrical wall 166 having an inner surface 168 and an outer surface 170. Inner surface 168 includes a pair of annular recesses 172 and 174 sized to receive bearing members 138 and 162, respectively. Inner surface 168 also includes a shoulder 176 (see e.g., FIG. 7) that engages wall portion 158 of locking sleeve 128 and a recess 178 sized to receive a resiliently compressible member 180, such as a compression spring, that biases release sleeve 164 toward the locked position shown in FIGS. 4 and 5. An annular boot 181 may also be received in recess 178 to prevent dirt and other debris from entering recess 178 and compromising operation of compressible member 180. Outer surface 170 may include a knurled finish 182 to aid a user in gripping release sleeve 164 during movement.

In the embodiment illustrated in FIGS. 4–7, second coupling member 124 includes a adapter 184 having a first threaded portion 186 and a valve body 188 having a central body passage 190, a port 191 at a leading end of passage 190, and a second threaded portion 192 engaged with first threaded portion 186. To secure second fluid coupling 124 to a fluid conveying member, such as hose assembly 26, valve body 188 may be provided with external threads 192 or other connecting interface, such as the barbed hose fitting shown in FIGS. 1–3.

In the illustrated embodiment, second coupling member 124 also includes a valve support member 194 received within adapter 184 to support an axially movable valve member 196. In a particular configuration, valve support member 194 includes an axially extending passage 198 size to receive a stem 200 of valve member 196 and at least one fluid flow passage 202 to permit fluid flow through valve support member 194. Valve support member 194 may be retained within adapter 184 using an annular locking member 204, such as a snap ring, split locking ring or the like.

In addition to stem 200, valve member 196 also includes a head portion 206 adapted to sealingly engage an interior surface 208 of adapter 184 adjacent an orifice 209 in a leading end 210 (see e.g., FIG. 7) of adapter 184. Head portion 206 may include a generally flat leading edge 212 adapted to engage leading edge 146 of fixed valve member 130 and a generally inwardly tapering sealing edge 214 adapted to engage interior surface 208. Optionally, head portion 206 may include an annular sealing member 216, such as an O-ring. A resiliently compressible member 218, such as a compression spring, is positioned between support member 194 and head portion 206 to bias movable valve member 196 toward the closed position shown in FIG. 7.

Figure 7:
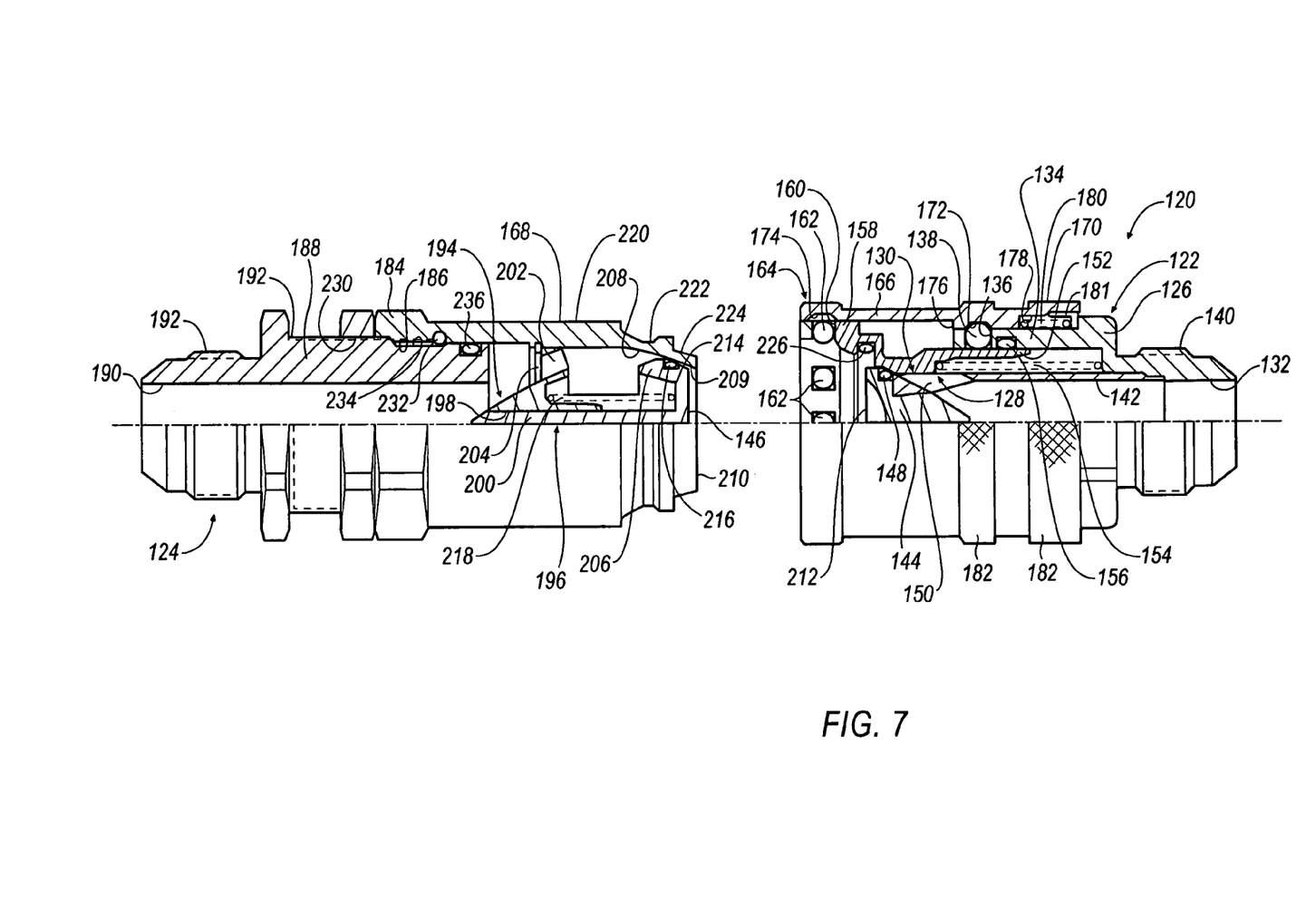
FIG. 7 is a partial cross-sectional view of the fluid connector of FIG. 4, shown in a disconnected state.

With reference to FIG. 7, an exterior surface 220 of adapter 184 includes a locking groove 222 configured to receive bearing members 162 when first and second coupling members 122, 124 are fully connected. Exterior surface 220 may also include a sealing portion 224 that engages an annular sealing member 226 in first coupling member 122 to inhibit fluid leakage therebetween.

As shown in FIGS. 4–7, second coupling member 124 may also include a rotatably adjustable collar 228 having internal threads 230 that mate with external threads 192 in valve body 188. Like collar 34 described above, collar 228 may be configured as a lock-nut having a polygonal outer surface 231 configured for engagement by a wrench or other tool used to rotate collar 228. Collar 228 may be rotated against adapter 184 and torqued to lock valve body 188 in the desired axial position. Alternatively, untorquing and rotating collar 228 away from adapter 184 allows adapter 184 to be rotated relative to valve body 188 to adjust the axial position of valve body 188 relative to valve support member 194. Once the desired position of valve body 188 is achieved, collar 228 may be rotated against adapter 184 and re-torqued to lock valve body 188 in the desired position.

To prevent unintended rotation of collar 228, holes (not shown) may be formed in collar 228 and adapter 184 to accommodate the attachment of a safety mechanism (see, e.g., FIG. 3) between the components. Adapter 184 may also include an annular stop member 232, such as a split locking ring or the like, to prevent valve body 188 from being removed from adapter 184. A portion of stop member 232 protrudes into a recess 234 in valve body 188 and engages valve body 188 when it is moved to the fully open position shown in FIG. 4. An annular sealing member 236 may also be positioned between valve body 188 and adapter 184 to inhibit fluid leakage therebetween.

Operation of fluid connector 120 will now be described with reference to FIGS. 4–7. When fluid connector 120 is in a fully open state, as shown in FIG. 4, fluid is free to flow through valve body 188 and flow passage 202 of valve support member 194, around movable valve member 196 and head portion 144, through flow passages 150 of valve stem 142 and then out of adapter 126 and into or out of the fluid conveying device to which fluid connector 120 is attached. When fluid connector 20 is in a fully closed state (see e.g., FIG. 5), the fluid flow path between central body passage 190 and flow passage 202 is closed off due to contact of valve body 184 with a sealing surface 240 on valve support member 194. To adjust the amount of fluid flow (or fluid flow rate) through fluid connector 120, the axial position of valve body 184 may be modified between the fully open position shown in FIG. 4 and the fully closed position shown in FIG. 5 by untorquing collar 228 and rotating adapter 184 relative to valve body 188. Since bearing members 138, 162 permit adapter 184 to rotate relative to first coupling member 122, even when fluid connector 120 is pressurized, the position of valve body 184 may be modified without disconnecting first and second coupling members 122, 124.

Figure 6:
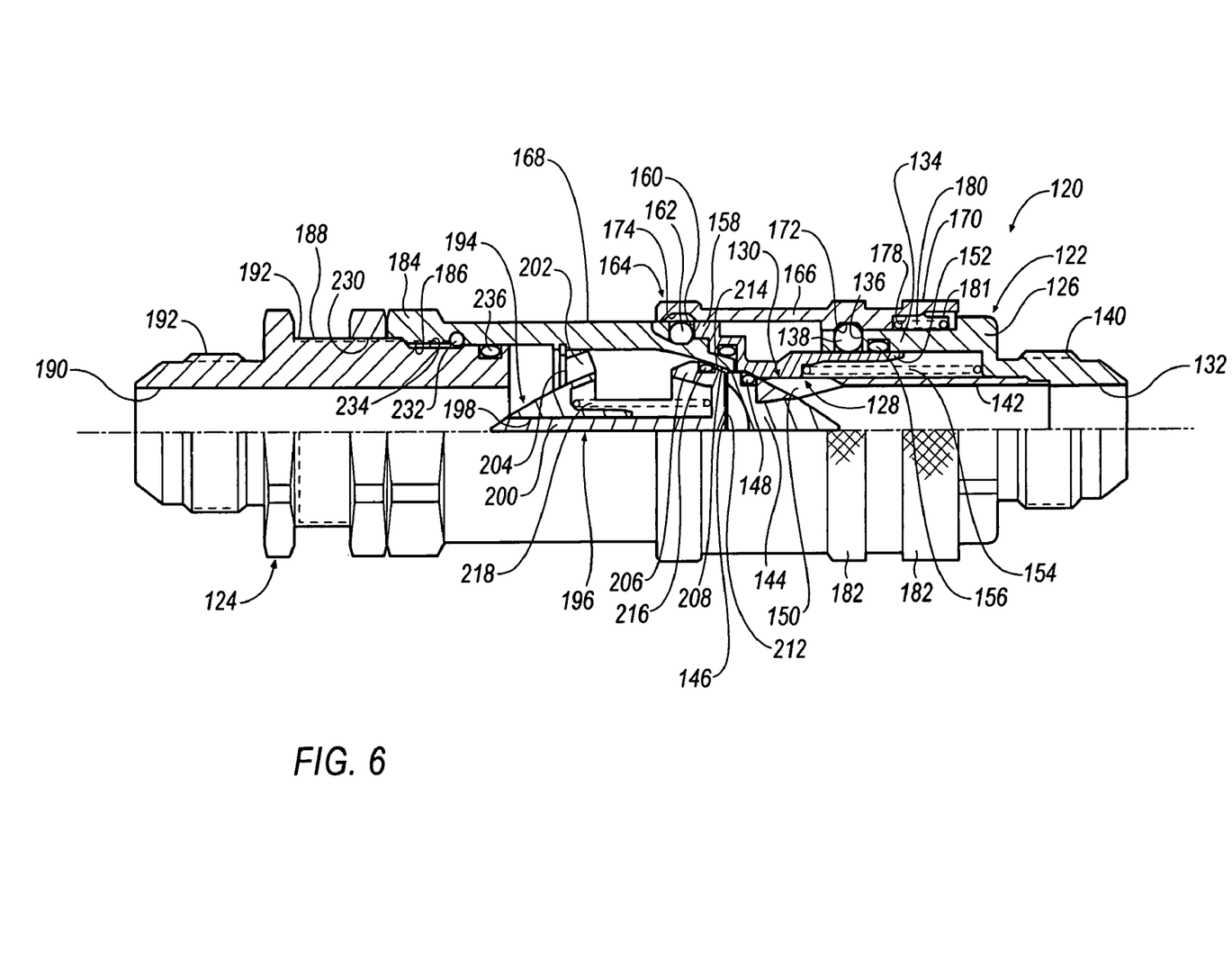
FIG. 6 is a partial cross-sectional view of the fluid connector of FIG. 4, shown in a partially disconnected state.

With reference to FIGS. 6 and 7, first and second coupling members 122, 124 may be disconnected by moving release sleeve 164 to the release position shown in FIG. 6, which aligns bearing members 138 with groove 172 and permits bearing members 138 to move axially outward and disengage from locking sleeve 128. Once disengaged from bearing members 138, locking sleeve 128 is free to be pushed leftward by resiliently compressible member 154 until locking sleeve 128 contacts head portion 144 of fixed valve member 130 and covers fluid flow passages 150. Accordingly, fluid flow through fluid connector 120 is terminated before first and second coupling members 122, 124 are disconnected.

As illustrated in FIG. 6, upon further leftward movement of locking sleeve 128, bearing members 158 become aligned with groove 174, move radially outward, and disengaged from adapter 184 allowing second coupling member 124 to be withdrawn from first coupling member 122. As second coupling member 124 is removed, movable valve member 196 is pushed toward leading end 210 of adapter 184 and into sealing engagement with inner surface 208. In contrast, when second fluid coupling 124 is pushed into first fluid coupling 122 during connection of fluid connector 120, movable valve member 196 engages fixed valve member 130 and is displaced by fixed valve member 130 between a first position in which movable valve member 196 sealingly engages adapter 184 and a second position in which movable valve member 196 is disengaged from adapter 184.

By incorporating valve body 188 into second coupling member 124, second coupling member 124 may be disconnected from and re-connected to first coupling member 122 without modifying the position of valve body 184 and the corresponding fluid flow rate through fluid connector 120. Additionally, valve members 130 and 196 permit first and second coupling members 122, 124 to be connected and separated with little or no fluid loss.

The present invention has been particularly shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. A fluid connector with adjustable flow control, comprising:
   a first coupling member including a fixed valve member;
   an adapter having a first threaded portion, a sealing surface and an orifice;
   a valve body having a second threaded portion for engagement with the first threaded portion and a central body passage connected to at least one port, the adapter and valve body comprising a second coupling member connectable to the first coupling member, the second coupling member including a movable valve member; and
   where, upon rotation of the valve body relative to the adapter, the port is displaced axially relative to the sealing surface thereby effecting a change in fluid flow through the fluid connector and into or out of the orifice.

2. The fluid connector of claim 1, further comprising a coupling joined to the valve body, the coupling adapted to be joined to a hose.

3. The fluid connector of claim 2, wherein the coupling is rotatable relative to the valve body.

4. The fluid connector of claim 1, wherein the first coupling member includes a movable locking sleeve displaceable from a closed position in which the locking sleeve is sealingly engaged with the fixed valve member to an open position in which the locking sleeve is disengaged front the fixed valve member.

5. A fluid connector with adjustable flow control, comprising:
   an adapter having a first threaded portion, a sealing surface and an orifice;
   a valve body having a second threaded portion for engagement with the first threaded portion and a central body passage connected to at least one port;
   an adjustable collar for locking the axial position of the valve body relative to the adapter; and
   where, upon rotation of the valve body relative to the adapter, the port is displaced axially relative to the sealing surface thereby effecting a change in fluid flow through the fluid connector and into or out of the orifice.

6. The fluid connector of claim 5 further including a safety mechanism for inhibiting movement of the collar.

7. A fluid connector with adjustable flow control, comprising:
   an adapter having a first threaded portion and a sealing surface;
   a valve body at least partially received within the adapter, the valve body including a second threaded portion for engagement with the first threaded portion and a central body passage connected to at least one port;
   a coupling joined to the valve body and configured to be joined to a hose, the valve body adapted to rotate relative to the coupling and the adapter;
   an adjustable collar for locking the axial position of the valve body relative to the adapter; and
   where, upon rotation of the valve body relative to the adapter, the port is displaced axially relative to the sealing surface thereby effecting a change in fluid flow through the fluid connector.

8. A fluid connector with adjustable flow control, comprising:
   a first coupling member including a first adapter, a movable locking sleeve and a fixed valve member, the movable looking sleeve displaceable from a closed position in which the locking sleeve is sealingly engaged with the fixed valve member to an open position in which the locking sleeve is disengaged from the fixed valve member;
   a second coupling member adapted to be connected to the first coupling member and including a second adapter having a first threaded portion and a valve body having a second threaded portion engaged with the first threaded portion, the second coupling member also including a sealing surface and a movable valve member displaceable by the fixed valve member from a first position in which the movable valve member sealingly engages the second adapter to a second position in which the movable valve member is disengaged from the second adapter; and
   where, upon rotation of the second adapter relative to the valve body, the valve body is displaced axially relative to the sealing surface thereby effecting a change in fluid flow through the fluid connector.

9. The fluid connector of claim 8 further including at least one bearing member positioned between the first adapter and the movable locking sleeve.

10. The fluid connector of claim 9, wherein the bearing member is configured to selectively inhibit axial movement of the locking sleeve relative to the first adapter, and facilitates relative rotation between the locking sleeve and the first adapter.

11. The fluid connector of claim 9 further including a selectively movable release sleeve configured to allow the bearing member to release the locking sleeve for movement relative to the first adapter.

12. The fluid connector of claim 8 further including at least one bearing member positioned between the movable locking sleeve and the second adapter.

13. The fluid connector of claim 12, wherein the bearing member is configured to selectively inhibit axial movement of the lacking sleeve relative to the second adapter and facilitates relative rotation between the locking sleeve and the second adapter.

14. The fluid connector of claim 12 further including a selectively movable release sleeve configured to allow the bearing member to release the second adapter for movement relative to the locking sleeve.

15. The fluid connector of claim 8, wherein the locking sleeve is biased toward the closed position.

16. The fluid connector of claim 8, wherein the fixed valve member includes a head portion and a valve stem supporting the head portion.

17. The fluid connector of claim 16, wherein the valve stem includes at least one fluid flow passage.

18. The fluid connector of claim 8, wherein the movable valve member is biased toward the second position.

19. The fluid connector of claim 8, wherein the second coupling member includes a valve support member adapted to support the movable valve member within the second adapter.

20. The fluid connector of claim 19, wherein the sealing surface is a surface of the valve support member.

21. The fluid connector of claim 8 further including an adjustable collar for locking the axial position of the valve body relative to the adapter.

22. The fluid connector of claim 21 further including a safety mechanism for inhibiting movement of the collar.

23. The fluid connector of claim 8, wherein the second adapter includes a stop member for limiting axial movement of the valve body.

24. The fluid connector of claim 8, wherein the valve body is adapted to be joined to a fluid conveying device.

* * * * *